H. M. WEST.
ENGINE STARTER FOR AUTOMOBILES.
APPLICATION FILED APR. 29, 1914.

1,180,093.

Patented Apr. 18, 1916.

Inventor
H. M. West,

UNITED STATES PATENT OFFICE.

HARRY M. WEST, OF ODEBOLT, IOWA.

ENGINE-STARTER FOR AUTOMOBILES.

1,180,093.  Specification of Letters Patent.  Patented Apr. 18, 1916.

Application filed April 29, 1914. Serial No. 835,276.

*To all whom it may concern:*

Be it known that I, HARRY M. WEST, a citizen of the United States, residing at Odebolt, in the county of Sac, State of Iowa, have invented certain new and useful Improvements in Engine-Starters for Automobiles; and I do hereby declare the following to be a full, clear, and exact description of the invention, such as will enable others skilled in the art to which it appertains to make and use the same.

My invention relates to automobiles, particularly to the engine, and has for its object the provision of an improved device whereby the engine may be started from the seat without the necessity of the occupant of the car getting out to crank the engine as has been the common and well known practice.

The object, broadly, of this invention is to provide a novel device of this character which is operable by means of a hand lever placed adjacent the seat of the automobile and which is adapted to set in motion certain mechanism for rotating the fly wheel of the engine, for drawing a charge into the cylinders and causing a spark within them for setting the engine in motion.

More specifically, the invention resides in the provision of hand operated means for setting in motion a fly-wheel which, through a train of gearing, is adapted to impart its momentum to the fly-wheel of the engine.

Figure 1:
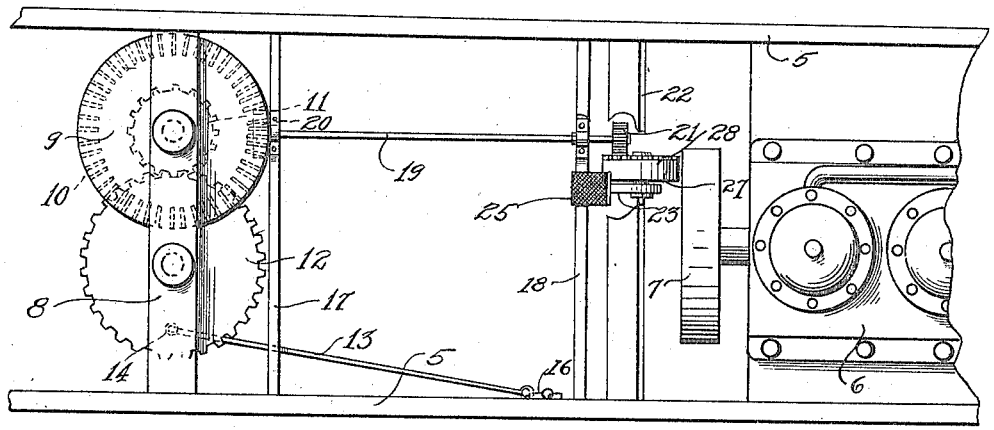
Figure 2:
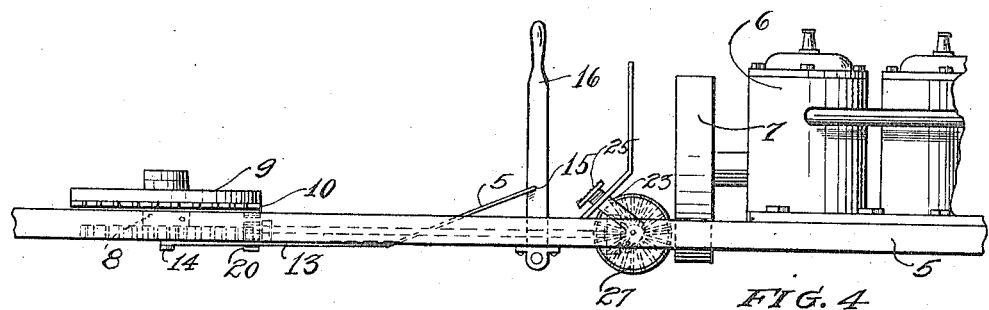
Figure 3:
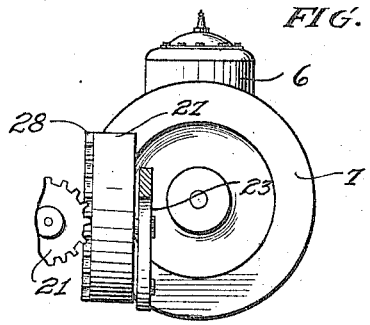
Figure 4:
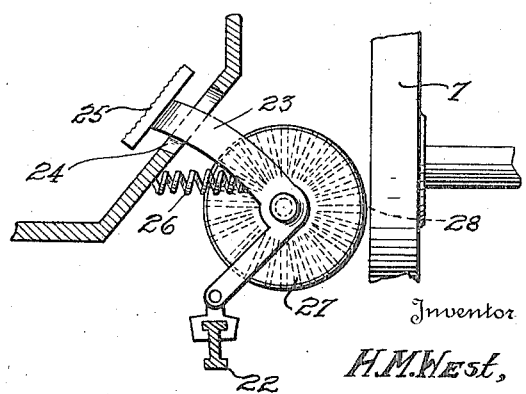
Figure 4:

Other objects and advantages such as extreme efficiency, certainty of operation, durability in service and the general improvement of the art will be carefully brought out in the following description and illustrated in the accompanying drawings in which, Figure 1 is a plan view of an automobile frame and engine showing my device applied, Fig. 2 is a side elevation thereof, Fig. 3 is a sectional view showing the friction wheel engaging the fly-wheel of the engine, and Fig. 4 is a detail view of the shifting foot lever and its associated parts, showing the foot lever extending through the dashboard.

Referring more particularly to the drawings, the numeral 5 designates the frame of an automobile upon which is mounted the engine 6, provided with the usual fly-wheel 7.

My invention is mounted on the frame and is constructed and arranged as will be described. Journaled upon a bar 8, extending transversely of the frame 5 is a fly-wheel 9 which is provided upon its lower face with teeth forming a crown gear 10. Upon its lower face the fly-wheel 9 has secured thereon a smaller spur gear 11 meshing with a second spur gear 12 journaled upon the cross bar 8. The fly-wheel 9 is rotated by the gear 11 meshing with the gear 12 which is rotated by means of a rod 13 eccentrically pivoted, as at 14, upon the gear 12 and connected at its forward end, as at 15, intermediate the ends of a vertically disposed hand lever 16 pivoted upon the frame 5. Bars 17 and 18 extend across the frame 5 and have journaled thereon a longitudinally extending shaft 19 provided upon its rear end with a spur gear 20 meshing with the crown gear 10 formed on the fly-wheel 9, and further provided upon its forward end with a spur gear 21 for a purpose to be described. Adjacent its forward end, the frame 5 is provided with a transverse rod 22 upon which is pivotally mounted an arm 23 which projects through a slot 24 in the dash board of the automobile and is provided upon its free end with a plate 25 to be engaged by the operator's foot. The arm 23 is normally held in its rearmost position by a coil spring 26. A crown gear 27 is journaled upon the arm 23 intermediate its ends and meshes with the gear 21 previously described. The periphery of the crown gear 27 is provided with a leather friction band 28. It is to be noted that the teeth on the crown gear 27 are of sufficient length that when the arm 23 is moved, the spur gear 21 will still remain constantly in mesh with the crown gear 27. Normally, the spring 26 holds the arm 23 in such a position that the periphery of the gear 27 is spaced slightly from the face of the fly-wheel 7 of the engine 6.

In the operation of the device it will be apparent that when the hand lever 16 is moved back and forth, the gear 12 will be rotated, in turn rotating the fly-wheel 9. Rotation of the fly-wheel 9 will cause the rotation of the gears 20 and 21 and consequently the crown gear 27. Movement of the lever 16 a few times will thus cause a high speed to be developed very quickly at the crown gear 27. The engine 6 is then started by the operator pressing his foot upon the plate 25 to move the arm 23 so that the periphery of the rapidly revolving gear 27 will contact with the face of the engine flywheel 7 imparting motion to it, and causing the sucking in of an explosive charge and the production of a spark within the engine cylinders. After the engine has started, and the operator releases his pressure upon the plate 25, the spring 26 will cause the arm 23 to return the gear 27 to its original position, breaking the contact of the periphery of the gear 27 with the engine fly-wheel 7.

In some types of engines in which the fly-wheel is inclosed, a disk may be readily secured upon the crank shaft of the engine at its forward end to be engaged by the gear 27. In such an event, the arm 23 would have to be lengthened.

It will be readily understood that many changes in the form, construction and arrangement of parts may be resorted to without departing from the spirit of the invention or limiting the scope of the claims.

Having described my invention, I claim:

1. In an engine starting device, the combination with a frame and an engine mounted thereon and including a fly wheel, of a foot lever pivoted at one end to the frame and terminating at its other end in a pedal, a friction gear rotatably supported intermediate the ends of said lever and movable therewith to operatively engage the fly wheel, means normally holding said lever retracted and said gear in inoperative position a second lever pivoted to the frame, and driving connection between said second lever and friction gear.

2. In an engine starting device, the combination with a frame and an engine mounted thereon and including a fly wheel, of a foot lever pivoted at one end to the frame and terminating at its other end in a pedal, a friction gear rotatably supported by said lever and movable therewith into operative engagement with the fly wheel, radially disposed elongated gear teeth formed in one side of said friction gear, a shaft mounted in the frame, a pinion on one end of said shaft slidably meshing with said elongated teeth, and means for rotating said shaft.

In testimony whereof, I affix my signature, in the presence of two witnesses.

HARRY M. WEST.

Witnesses:
A. O. MEAD,
A. H. LUNDBERG.

Copies of this patent may be obtained for five cents each, by addressing the "Commissioner of Patents, Washington, D. C."